United States Patent [19]

Di Santo et al.

[11] Patent Number: 4,833,464
[45] Date of Patent: May 23, 1989

[54] ELECTROPHORETIC INFORMATION DISPLAY (EPID) APPARATUS EMPLOYING GREY SCALE CAPABILITY

[75] Inventors: Frank J. Di Santo, North Hills; Denis A. Krusos, Lloyd Harbor; Edward Lewit, Roslyn Heights, all of N.Y.

[73] Assignee: Copytele, Inc., Huntington Station, N.Y.

[21] Appl. No.: 96,037

[22] Filed: Sep. 14, 1987

[51] Int. Cl.$^4$ .............................................. G09G 3/34
[52] U.S. Cl. .................................... 340/793; 340/787; 350/362
[58] Field of Search ............... 340/793, 787, 788, 805; 350/362

[56] References Cited

U.S. PATENT DOCUMENTS

| 3,984,862 | 10/1976 | Volz | 340/805 |
| 4,203,106 | 5/1980 | Dalisa et al. | 350/362 |
| 4,427,979 | 1/1984 | Clerc et al. | 340/793 |
| 4,586,039 | 4/1986 | Nonomura et al. | 340/784 |
| 4,655,897 | 4/1987 | DiSanto et al. | 350/362 |
| 4,741,604 | 5/1988 | Kornfeld | 350/362 |

OTHER PUBLICATIONS

"A Magnetic-Particles Display"; Proceedings of the Society for Information Display; Lawrence L. Lee; vol. 16, No. 3 1975, pp. 177–183.

*Primary Examiner*—Donald J. Yusko
*Assistant Examiner*—Jeffery A. Brier
*Attorney, Agent, or Firm*—Arthur L. Plevy

[57] ABSTRACT

Various techniques and apparatus for grey scale operation for an electrophoretic display panel (EPID) are provided. The apparatus includes circuitry with a timing generator which produces a plurality of different time duration output waveforms which are applied to the X and Y drivers associated with the EPID. In this manner by applying a set of voltages for a given short time interval, a display is provided which results in the incomplete removal of pigment from an associated selected pixel. Hence, that pixel appears darker than surrounding pixels but not as dark as the pure dye solution as associated with the display. The amount of pigment removed and hence the darkness of each pixel is a function of the time duration during which appropriate voltages are applied to the rows and columns of the EPID. In this manner the timing generator can cause different pixels as displayed to have different darknesses or grey scale values by varying the time during which the voltage is applied to the display.

20 Claims, 5 Drawing Sheets

ELECTROPHORETIC INFORMATION DISPLAY (EPID) APPARATUS EMPLOYING GREY SCALE CAPABILITY

BACKGROUND OF THE INVENTION

This invention relates to electrophoretic information displays (EPID) in general and more particularly to apparatus which operates in conjunction with an EPID display enabling such a display to employ grey scale capability.

The prior art is replete with a number of various patents and articles concerning electrophoretic displays. Such electrophoretic displays have been widely described and disclosed in the prior art, and essentially the assignee herein, namely-Copytele, Inc. of Huntington Station, New York, has recently developed an electrophoretic display which has an image area of approximately 11×8½ inches and is designed to be used either as a separate display or to be combined with other displays. The company has the ability to combine as many as four such displays to create image areas as large as approximately 22×17 inches.

The information on such displays can be changed either locally or remotely and can be viewed at an angle of nearly 180°. Such displays have extremely high resolution and can accommodate over 160,000 pixels within an image area of approximately 2.8 inches diagonally. In regard to such displays, reference is made to U.S. Pat. No. 4,655,897 issued on Apr. 7, 1987 entitled ELECTROPHORETIC DISPLAY PANELS AND ASSOCIATED METHODS to Frank J. DiSanto and Denis A. Krusos and assigned to Copytele, Inc., the assignee herein.

In that patent there is described an electrophoretic display panel which includes a planar transparent member having disposed on a surface a plurality of vertical conductive lines to form a grid of lines in the Y direction. On top of the grid of vertical lines there is disposed a plurality of horizontal lines which are positioned above the vertical lines and insulated therefrom by a thin insulating layer at each of the intersection points. Spaced above the horizontal and vertical line pattern is a conductive plate. The space between the conductive plate and the X and Y line pattern is filled with an electrophoretic dispersion containing chargeable pigment particles.

When a voltage is impressed on the X and Y lines, pigment particles which are located in wells or depressions between the X and Y pattern are caused to migrate towards the conductive plate and are deposited on the plate in accordance with the bias supplied to the X and Y conductors.

There is described in that patent an electrophoretic dispersion suitable for operation with the display as well as techniques for fabricating the display. Hence, in this manner the displays can be fabricated to contain large effective display surfaces while being relatively thin and which are capable of high resolution and relatively low power. As indicated, the above-noted patent and others include information concerning the fabrication, operating and resolution of such displays.

In any event, it has been an extreme problem in regard to such displays to provide grey scale capability. Grey scale capability is a well known term of art and has been utilized for example in regard to the description of television receivers and various other types of data presentations such as in facsimile and so on. In the case of television receivers, the response of the receiver can be visually determined by means of typical test patterns such as those test patterns that were previously transmitted and displayed when for example a television station goes off air. Various television stations frequently transmit such a pattern for the convenience of service technicians and so on. The pattern, apart from showing correct linearity, for example the test pattern circles should appear with constant radii, permits other features to be observed. Such test patterns also show correct reproduction of the background shading which indicate proper low frequency response while correct reproduction of the five color shades in the center target area of a test pattern indicates proper mid-frequency responses. High frequency response is shown by the vertical wedges.

In any event, as one can ascertain, such test patterns are associated with grey scale capability--namely, with the display of various levels of grey as located between the shades of black and white. Such grey scale capability is a desirable feature in conjunction with any type of display. Essentially, an electrophoretic display either presents a black or a white representation of a particular image. There are no grey scale variations as the color of all graphic information presented on the display is determined by the presence or absence of pigment hence one can view such displays as being either black or white or dark or light.

It is therefore an object of the present invention to provide an electrophoretic display having grey scale capability.

It is a further object of the present invention to provide an electrophoretic display apparatus which has grey scale capability and which operates in conjunction with commercially available components to provide grey scale capability in such a display at a realistic cost and a reduced complexity.

BRIEF DESCRIPTION OF THE PREFERRED EMBODIMENT

Apparatus for providing grey scale capability for an electrophoretic information display (EPID), comprising timing generator means coupled to said display and operative to provide a voltage waveform for energizing said display and means for selecting the duration of said waveform as applied to said display according to a desired grey scale level.

DETAILED DESCRIPTION OF THE FIGURES

Figure 1:
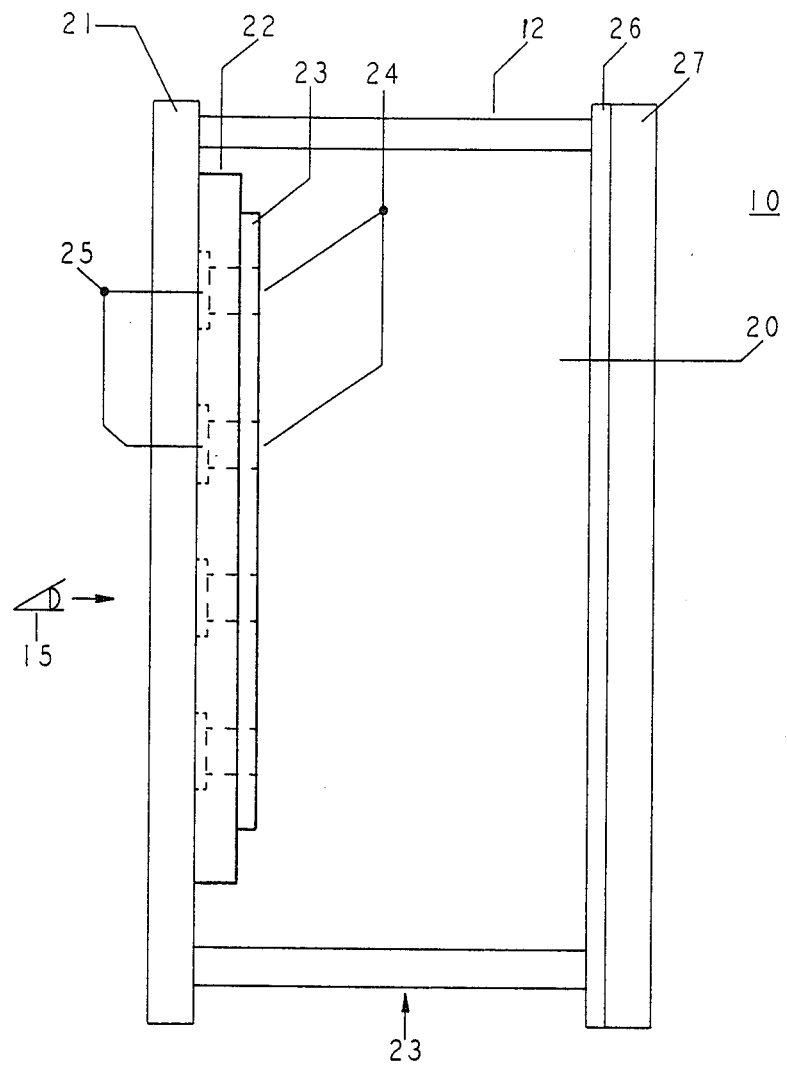
FIG. 1 is a side plan view of an electrophoretic display (EPID) employed with this invention.

Referring to FIG. 1, there is shown a side view of a typical electrophoretic display 10.

The display 10 of FIG. 1 is filled with an electrophoretic solution 20 which includes light colored pigment particles suspended in a dark dye solution. For examples of such solutions and techniques, reference is made to the above-cited U.S. Pat. No. 4,655,897.

As seen from FIG. 1, the display contains a front glass sheet or viewing surface 21. The eye of viewer 15 is shown viewing the front of the display via the glass sheet 21. Disposed upon the glass sheet 21 by suitable etching techniques are columns 23 and rows 25. The columns are made from an extremely thin layer of indium-tin-oxide (ITO) while the rows are made from thin layers of aluminum. These patterns are provided in extremely thin layers and essentially constitute an X Y matrix. The layers of ITO as can be seen by reference to the above-noted patent are relatively thin, being approximately 300 Angstroms in thickness. In any event, the grid or columns (X Y) and the rows of cathodes are spaced from one another and insulated from one another by means of an insulating layer 22.

While the grids and cathodes have been specified in terms of rows and columns, it is immediately apparent that the terms can be interchanged as desired. In any event, each of the grid and cathode intersections are associated with a pigment well 24. These wells contain electrophoretic solution which is in the cavity 20. The columns and rows are separated from a back electrode 26 or anode plate which is also fabricted on a sheet of glass 27 and constitutes a thin layer of ITO. The spacers such as 22 and 23 can be implemented in many different ways and essentially serve to mechanically separate the display cell or panel 10.

In any event, in operation of the display the pigment particles contained in the electrophoretic solution 20 are brought forward towards the viewing surface in order to fill the wells formed between the rows and columns. Once a well such as well 24 is filled, the voltage on the rows, columns, and rear cover is then set such that the wells remain filled but pigment spaced between the rear cover and the columns are swept unto the rear cover plate 26. The viewing side 21 is the color of the pigment in the wells.

By selectively applying voltages to the rows and columns, the pigment in individual wells 24 (at the intersection of the rows and columns selected) is forced out of the wells exposing the dye solution and making that intersection (pixel) dark. The removal of the pigment from the wells is not instantaneous but requires a period of time which depends upon the dimension of the cell or display, the fluid components, and the various applied voltages. In general, applying a set of voltages for too short a period of time results in incomplete removal of pigment from the well. Hence, that pixel appears darker than the surrounding pixels but not as dark as the pure dye solution. The amount of pigment removed and hence the darkness of the pixel is a function of time during which appropriate voltages are applied to the rows and columns. Different pixels can be made to have different darkness or grey scale values by varying the time the voltages are applied. This essentially is the basis of the present application and such techniques for accomplishing this will be further described.

Figure 2:
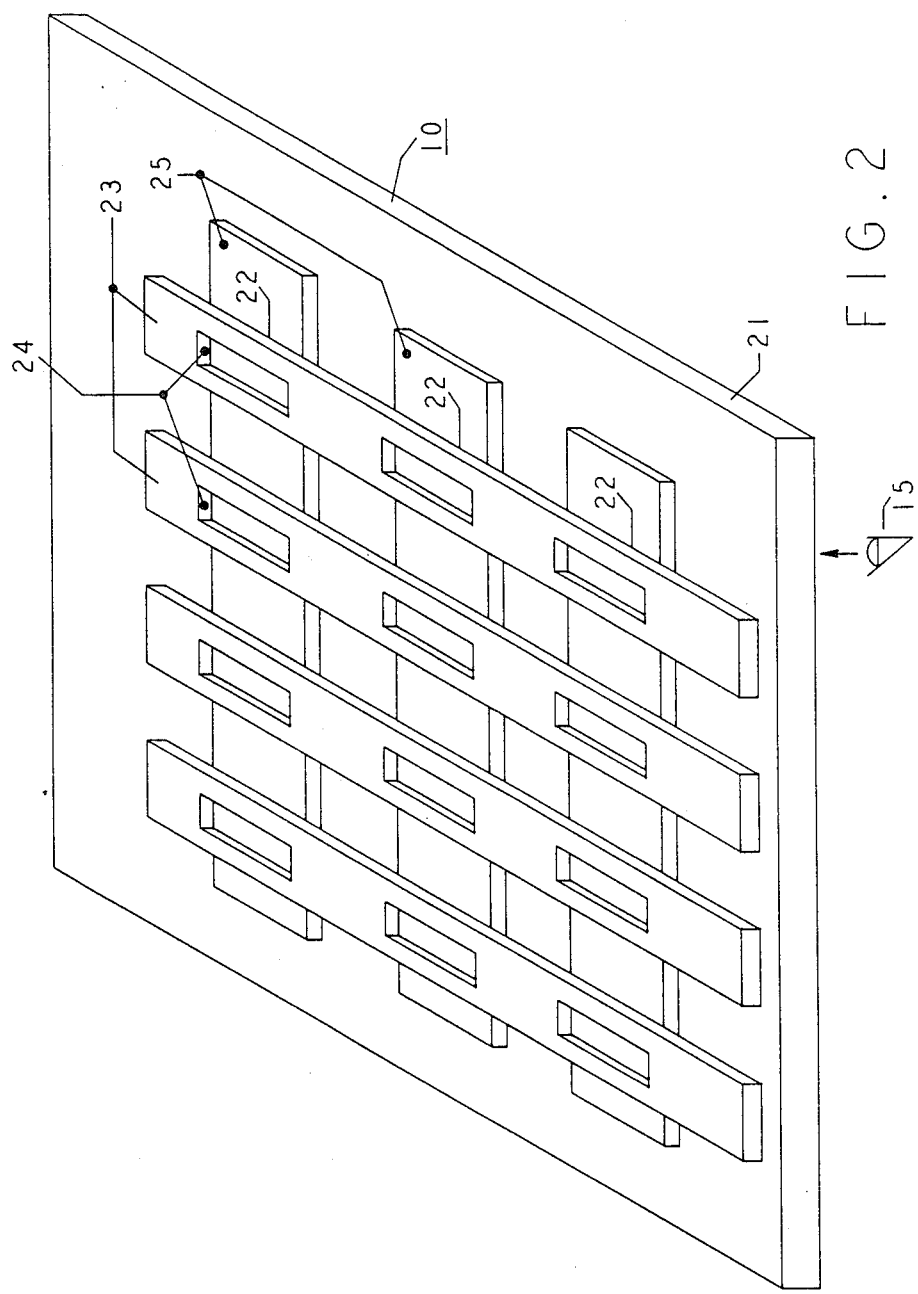
FIG. 2 is a perspective plan view of an electrophoretic display panel showing a given number of grid and cathode lines.

Referring to FIG. 2, there is shown a planar plan view of an enlarged representation of an electrophoretic display cell or panel according to FIG. 1.

As seen in FIG. 2, each well 24 is accommodated between an intersection of a column ITO layer 23 which is insulatively separated from a row layer of ITO 25. The well 24 forms a pixel area which is indicative of an X Y intersection of the ITO display. As will be explained there are a number of methods which may be used to determine the grey scale operation of the display. As indicated above, the timing or duration of the application of voltages to the X and Y intersection determines the exact intensity of the pixel at that intersection or the grey scale value.

There are a number of methods which may be employed to determine the correct timing. One method provides for a test pattern and external controls for the operator which are set to determine the proper grey scale values. This method is essentially an open loop technique wherein the actual panel image is controlled by an operator. Such techniques are of course employed in home television receivers and the control is referred to as a contrast control.

A second technique utilizes a small portion of the panel which portion may be hidden from the viewer to generate a fixed test pattern. Light emitters and sensors (LED/Detector pairs) are used to pick up the actual grey scale and automatically adjust the timing of the appropriate circuits. This method is closed loop as the panel is controlled by sensors located on the panel itself. Both methods will be referred to in the subsequent figures. In any event, it is again understood that the amount of pigment removed in such a display and hence the darkness of a pixel is a function of the time during which appropriate voltages are applied to the rows and columns. Hence, different pixels can be made to have different darkness or grey scale values by varying the time during which voltages are applied to the X and Y lines or the cathode and grid lines of the associated electrophoretic display.

Figure 3:
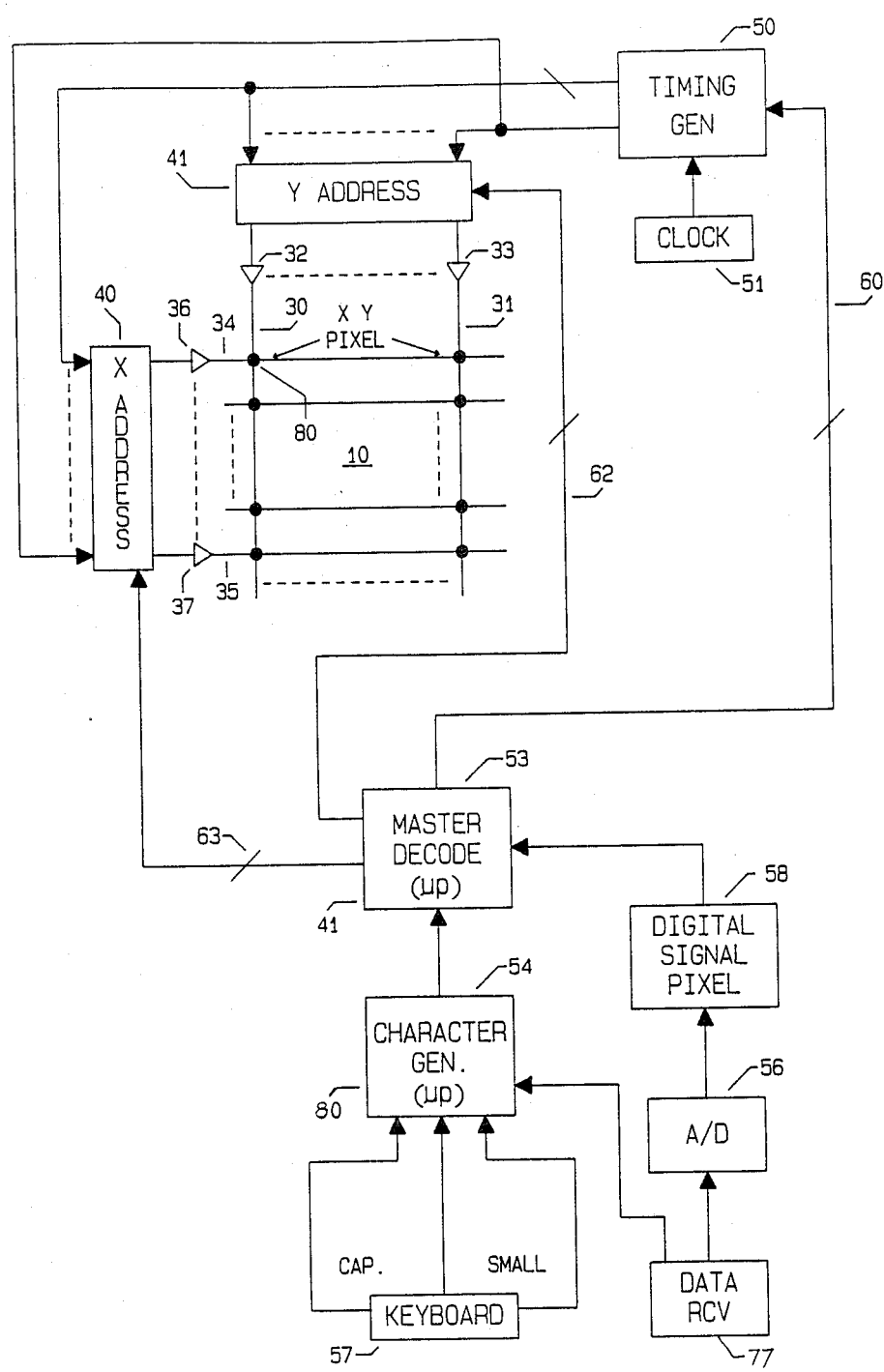
FIG. 3 is a detailed block diagram depicting apparatus employed with an electrophoretic display and capable of grey scale operation.

Referring to FIG. 3, there is shown a circuit configuration for an electrophoretic display panel 10. It is, of course, understood that the cathodes and grids while described previously in the X Y planes can be reversed whereby the cathode lines can be arranged in the Y plane with the grid lines in the X plane or vice versa.

As one can see from FIG. 3, each Y line such as 30 and 31 is associated with a suitable driver amplifier as amplifier 32 and 33 where each X line such as line 36 and 37 is associated with a grid driver amplifier as 34 and 35. It is, of course, seen immediately from FIG. 3 that the dots which appear between amplifiers 34 and 35 and amplifires 32 and 33 are employed to indicate a plurality of individual amplifiers indicative of large numbers of lines. In this manner by applying proper biasing potentials on respective amplifiers, one can activate or cause particles to migrate at any intersection between the X and Y matrix formed by the associated grid and cathode lines. Thus, based on the X and Y matrix, one can therefore produce any alpha-numeric character, or essentially for a large plurality of intersections, one can provide an graphic data such as a television picture or any type of display on the display panel 10. The display will be produced with high resolution based on the techniques of fabricating line patterns and based on the presently available display techniques.

The driver amplifiers as amplifiers 32 and 33 are fabricated by typical integrated circuit techniques and may for example be CMOS devices, all of which are well known and many of which are available as conventional integrated circuit chips. As indicated, the resolutions of EPID panels are high, and based on modern integrated circuit techniques including the fabrication techniques employed in conjunction with such displays, it is anticipated that the resolutions of such displays can be as high as 40,000 dots per square inch or greater.

As seen from FIG. 3, the Y amplifiers such as 32 and 33 are coupled to a Y address module 41. Essentially, the address module 41 is a well known component and consists of various conventional decoding devices and may include buffer registers and so on for the storage of data for introduction to the various columns associated with the display 10. In a similar manner the amplifiers 36 and 37 have their inputs coupled to an X address module 40 which again is a similar module to module 41 and operates to provide X information for the X Y intersections provided by the display. Means for addressing and X Y matrix is solved by many typical circuit solutions in the prior art and such decoders as the Y address decoder 41 and the X addresss decoder 40 are well known components in the prior art.

In any event, both the X and Y address decoders are coupled to a master timing generator 50 which operates in conjunction with a system clock 51. As will be explained, the timing generator 50 is operative to produce at its various output lines a series of varying pulse width signals at given operational potentials. These signals are selected such that each X Y intersection can be operated to produce a different grey scale value according to the timing as generated by the timing generator 50 and as applied to the X and Y address decoders 40 and 41. Coupled to the timing generator 50 is a master decode module 52 which is coupled to a character generator 40 and a digital pixel generator 58. Essentially, as will be explained, the character generator 40 is coupled to a keyboard 57 and both the character generator 54, the decoder 53 and the keyboard 57 may be all part of a conventional computer system, such as a PC system.

In a similar manner there is another path shown whereby there is a data receiver 57 which is capable of receiving data from a typical telephone line or other transmission media. The output of the data receiver 57 is coupled to an analog-to-digital converter 56 for transforming the analog signals into a digital signal at the output of the A/D converter 56. The A/D converter 56 is associated with a digital signal pixel generator 58 which operates in conjunction with the master decoder 53 to select various inputs from the timing generator 50 via the timing generator bus 60. The output of the decoder 53 is also coupled respectively to the X and Y address modules 40 and 41 via respective data buses 62 and 63.

As indicated above, the amount of pigment removed and hence the darkness of any pixel of the display 10 is a function of the time during which the appropriate voltage is applied to the rows and columns or the grids or cathodes. Hence, different pixels can be made to have different darkness or grey scale values by varying the time the voltages are applied. The master timing generator 50 as coupled to the clock 51 is basically a binary divider which consists of cascaded multivibrators. The clock 51 is selected to operate at a given frequency. The timing generator has a plurality of outputs each of which is a divided clock signal and each of which output exhibits a different given time period which will therefore cause a given pixel to display a different grey scale value according to the timing applied to that particular pixel as selected via the timing generator 50.

Essentially, as will be clearly understood by those skilled in the art, the implementation of timing generators or dividers to divide a clock frequency by a given number of values and to provide output signals of different time durations is a well known prior art technique.

It is, of course, understood that in order to generate a dark or a different intensity pixel, one may take any given X Y address or any given X Y intersection and utilize the same exact clock duration for multiple periods. For example, a 10 millisecond clock signal duration may be employed and one can use that clock one or more times to impress the data on any particular X Y intersection. In this manner if one for example addressed the X Y pixel designated by numeral 80 one time, one would achieve a certain darkness. If one then wrote the information into the X Y intersection 80 a second time, one would generate different grey levels. If this process was repeated over a third, fourth, fifth and sixth time interval, the particular area designated by that pixel would change in grey scale. Hence, by selecting a timing duration according to the anticipated darkness or grey scale associated with each pixel as provided by timing generator 50, one can therefore generate various grey scale values for the display as a function of the width or duration of the particular timing level.

As seen from FIG. 3, there is a keyboard 57 which is associated with a character generator 54. The character generator converts the output from the keyboard as is well known, into alpha-numeric information for character display. The display 10 can be utilized as for example as a replacement for a CRT in a typical computer system.

In any event, in regard to the keyboard mode the operator would commence typing in ordinary information, and as shown, the keyboard 57 interfaces with the character generator 54 which of course can be part of a microprocessor or can be a programmed format. The function of the character generator 54 is to translate each of the alpha-numeric letters emanating from the keyboard 57 into suitable X Y values via the master decoder 53. At the same time, for example, capital letters can be presented on the display in darker background then small letters. This is very easily done by the decoder 53 which would therefore via the output bus 60 sequence the timing generator 50 to select an appropriate longer timing signal each time a capital letter is indicated as compared to a small letter. In this manner all capital letters appearing on the display 10 would be darker than all small letters. The same technique can be easily employed to differentiate or darken any desired portion of a text according to the desire of the keyboard operator by depressing a suitable cursor button on the keyboard. In this manner, anything that the operator wishes to emphasize such as a quotation and so on can be darker than the remaining text in the rest of the paragraph.

Hence, the decoder 53 via the bus 60 will enable the timing generator 50 to provide longer timing periods for application to either the X or Y address modules 40 and 41 each time a capital is indicated or each time a particular portion of the displayed text is to be dark with respect to the remaining text. There is also shown a date receiver 57 which may be coupled to an ordinary communications link such as a telephone line and so on. The function of the data receiver 57 which may be a facsimile receiver or other receiver is to receive a digitized or an analog signal and via means to the analog-to-digital converter 56 to convert the signal to a suitable digital signal. As is known, the signal from data receiver 57 contains information in regard to brightness or contrast and this information would be normally converted by the analog-to-digital converter whose output provides a series of digital values indicative of the intensity at each pixel location in an X Y matrix.

The output of the analog-to-digital converter 56 conventionally is coupled to a digital signal pixel generator 58 of the type of pixel generator used in the conversion of an analog television signal into a digital signal. In this manner the digital signal pixel generator 58 is again coupled to the master decoder 53 which thereby selects via the bus 60 a different width drive signal for the X and Y addresses. In this manner each X and Y address receives an energizing signal whose duration is a function of the particular grey scale intensity associated with the digital signal emanating from the generator 58. hence, as one can understand, as the amount of pigment is removed, the darkness of the pixel is a function of the time in which the appropriate X and Y voltages are applied to the respective rows and columns. Hence, each different pixel in an entire picture or presentation can be made to have different darkness or grey scale values by varying the time the voltages are applied. This is easily implemented by the above-described circuit in conjunction with the master timing generator 50 which operates to divide the clock frequency 51 into a plurality of different time duration signals corresponding to different grey scale values. Hence, for example between white and black one can have 10, 15, 20 or more or less different grey scale values and thereby provide a display presentation which has absolute grey scale capability.

Figure 4:
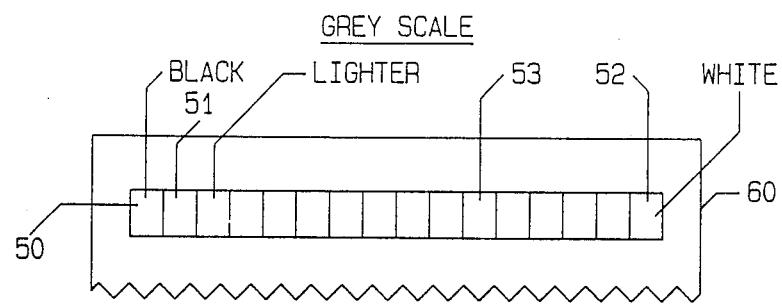
FIG. 4 is a front plan view of a typical grey scale presentation which can be employed in conjunction with this invention.

Referring to FIG. 4, there is shown an implementation of a closed loop type system. Essentially, referring to FIG. 4, numeral 60 represents a portion of the electrophoretic display panel 10 as for example that shown in FIGS. 1, 2, and 3. Prior to the transmission of a document on the display panel or prior to the generation of such a document on the display panel, the master decoder provides a typical line of information consisting of various grey scale levels between a black level 50 and a white level 52. The grey scale levels have been indicated as for example a level or area 51 which is grey but lighter than black while level 53 is less grey and closer to white and so on. The number of levels between black and white can vary according to the preferances of the display user.

In any event, as shown in FIG. 4, the display panel 10 may have one or more lines which are sent at the top or side edge of the display panel outside the viewing area to enable one to obtain a series of grey scale presentations. As seen in FIG. 4, the panel 60 which consists of a transparent layer of ITO disposed upon a glass layer is shown in side view. Each of the areas as for example 50, 51, 53 and 52 of the predesignated line of information as shown on panel 60 is associated with a FET or other device 62 having its source or drain electrode coupled to an LED diode 64 via a biasing resistor 65. In this manner, when one applies an enable pulse to the gate electrode of the FET 62, one turns on the LED 64 in the light transmitting mode.

Figure 5:
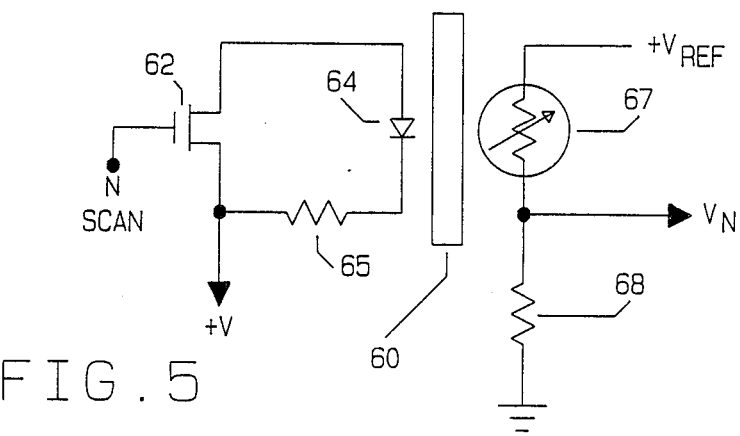
FIG. 5 is a simple circuit diagram showing a particular indicator circuit for deriving a grey scale value from a display as that shown in FIG. 4.
Figure 6:
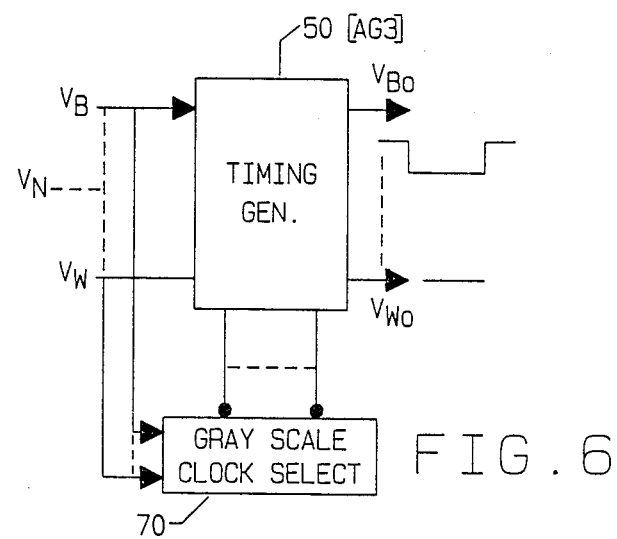
FIG. 6 is a simple block diagram showing the control of a timing generator based on a series of voltages as obtained from the circuit of FIG. 5.

Located behind the panel or on the panel and associated with each of the areas 50, 51, 53 and 52 is a light receiving or light sensitive resistor 67 (FIG. 5) which forms part of a divider in conjunction with a fixed reference resistor 68. The voltage divider consisting of the photosensitive resistor 67 and the fixed resistor 68 is biased by means of a reference voltage designated as $+V_{REF}$. In this manner, depending upon the amount of light transmitted through the panel at a particular area, the voltage at the center of the divider designated as $V_N$ is a function of the intensity of that area. Hence, the voltages as $V_N$ shown in FIG. 6 are applied to inputs to the timing generator 50. In this manner each voltage generated at each of the areas produces a corresponding reference voltage as a function of the amount of light that is transmitted through the panel. In this manner, one can obtain a series of voltages as $V_N$ which are indicative of the different grey levels between black and white.

It is, of course, understood that pure black indicates a zero light transmission and hence resistor 67 would be of a fixed value. Pure white would indicate a full transmission through the panel and hence resistor 67 would be at a completely different value. This provides a black value for $V_N$ designated as VB and a second extreme value of $V_N$ for white designated as VW. Hence, the timing generator 50 is controlled to produce a series of output duration pulses such as $V_B$ and $V_W$ at outputs for biasing the display. This can be done via the grey scale selector 70 whereby the width of the pulse applied to each of the X Y intersections would be indicative of a particular black or grey or white level as determined by the circuit of FIG. 5 operating in conjunction with the display or grey scale as shown in FIG. 4. The levels $V_B$ to $V_W$ can be used to control the clock source as 51 of FIG. 3 to vary its period and hence automatically change the timing generator output signals.

Hence, as one can ascertain, the exact duration for each electrophoretic display would be a function of the transmistivity of the particular panel area based and selected according to the grey scale which is pretransmitted prior to the generation of each picture. In this manner the remaining grey scale values for each X Y intersection would be decoded based on the circuitry shown in FIG. 3 with the pulse duration selected as a function of the voltage applied to the timing generator 50 of FIG. 6 and selected in accordance with the LED detector pairs utilized at each particular area of grey scale displays.

Figure 7:
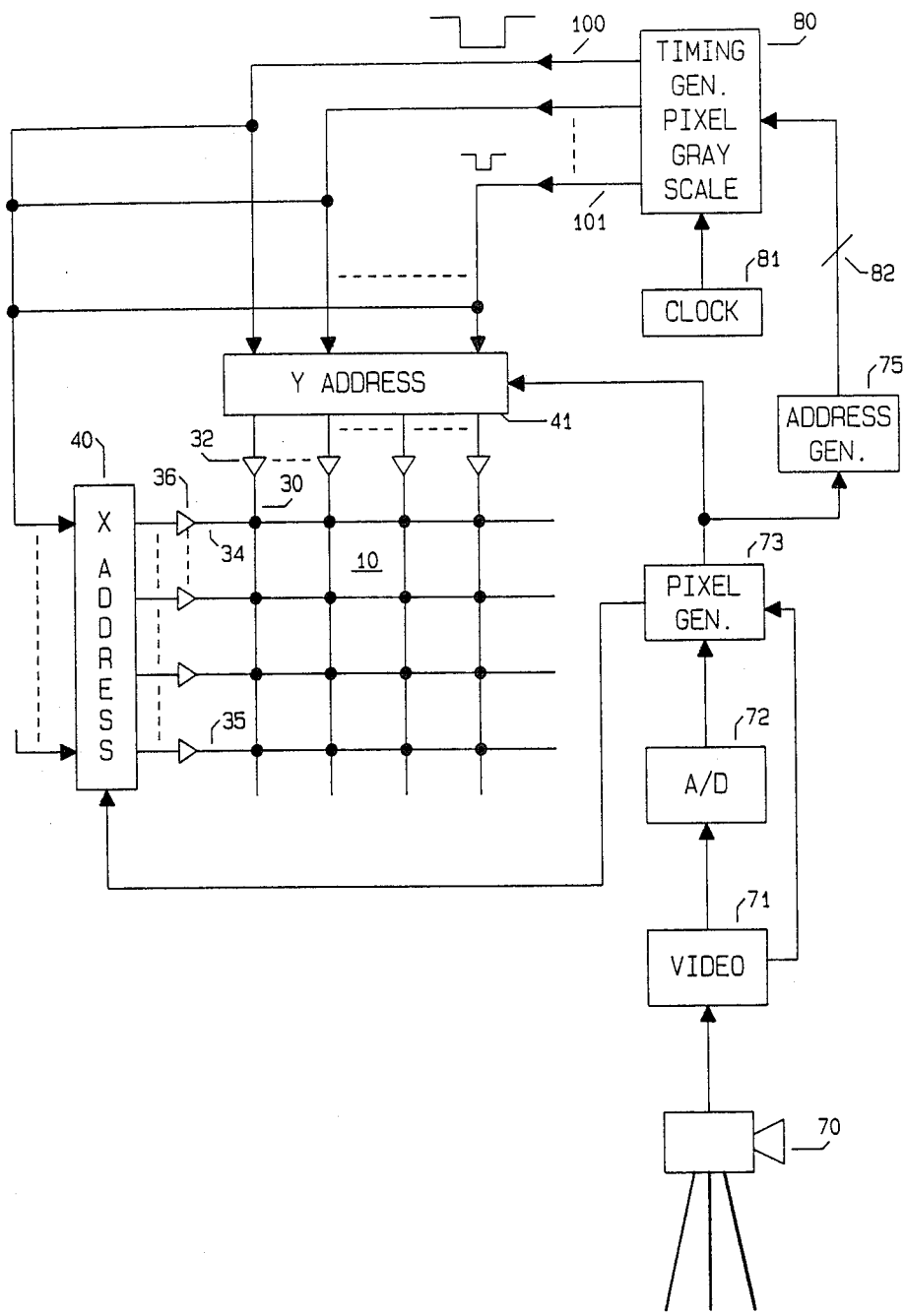
FIG. 7 is a detailed block diagram showing an electrophoretic display operating in conjunction with a television camera for generating television-like images on the high resolution electrophoretic display.

Referring to FIG. 7, there is shown a system whereby the above-noted apparatus and techniques are employed in producing a television-like display on the front surface of an electrophoretic display 10 operating in an X Y matrix mode. As one can ascertain from FIG. 7, a television camera 70 views a scene or display and produces an output video signal designated by module 71. It is well known that the video signal has horizontal and vertical synchronizing pulses which determine the number of lines and the position within each of the lines. The video signal emanating from the camera 70 is applied to an analog-to-digital converter 72 which is a well known component and is employed in many modern day television receivers as well as employed in conjunction with many modern day television cameras.

The output of the analog-to-digital converter 72 is coupled to a pixel generator 73 which utilizes the horizontal and vertical sync signals to generate a line and a pixel count. Hence, for each televison line whether it is within a field or a frame, there is generated a pixel. In this manner each line may have a plurality pixels associated therewith such as 256, 512 and so on. Pixel generators as generator 73 are well known and produce an X Y address plus an intensity or digital signal indicative of the particular grey scale associated with the pixel. The output of the pixel generator 73 is coupled to an address generator 75 and also operates to control the X address register 42 and the Y address register 41.

As one can ascertain, the control of the pixel generator via the X and Y address registers 40 and 41 is implemented in the same manenr as in a conventional freeze-frame or ROM memory associated with an ordinary CRT. In this manner the display 10 replaces the conventional CRT operation in conjunction with a pixel generator 73. In any event also associated with the pixel generator and coupled to the output thereof is an address generator 75. In this manne the address generator receives a converted signal whereby the address generator via the output bus 82 selects any one of a given number of predetermined signals on output lines 100 to 101 of the timing generator 80.

These output lines 100 to 101 produce an given voltage levels of a given time duration and each indicative of a particular grey scale value as described above. Again, the timing generator which is also designated as a pixel grey scale generator operates in conjunction with the clock 81. The timing generator 80 will produce at its output a series of divided clock signals each having a selected duration of a time necessary to provide black as on line 100 and via time necessary to provide white. It is understood that all other durations between lines 100 and 101 are indicative of different grey scale levels. Thus, as one can see from FIG. 7, the entire display including the intensity or grey scale at each pixel location or in regard to blocks of pixels is automatically provided according to the above described techniques. It should be thus apparent in conjunction with reading the above-noted specification that there are many other ways of controlling the effective intensity of an electrophoretic display panel whereby the intensity of a particular value or pixel is a function of the time during which the appropriate X and Y voltages are applied to the rows and columns associated with that display.

Thus, as explained above, applying a set of voltages for too short a period of time results in incomplete removal of pigment from the associated well as associated with the pixel, and hence that pixel appears darker than the surrounding pixels but not as dark as the pure dye solution. The amount of pigment removed from each cell and hence the darkness of the pixel is a function of the time during which appropriate voltages are applied to the rows and columns. Different pixels can be made to have different darknesses or grey scale values by varying the time the voltages are applied. This time variation is supplied by the timing generator as 80 of FIG. 7 or can be implemented by utilizing a fixed timing scheme whereby a fixed timing duration is constantly rewritten into the display during a given time interval. Hence, if one desires a darker pixel, one would use the same time duration pulse one or more times as compared with adjacent pixels which one would write into less times.

Hence, in this manner as one will readily understand, all dark pixels can first be written into via a frame freeze type of operation whereby all dark or black pixels are written into at the same time by addressing the X Y grid matrix. Therefore, one may write in simultaneously all the dark pixels associated with the entire display. Then, during the next sequence, one would write in all the grey pixels associated with the display and so on. It should be thus apparent to those skilled in the art that the above-described techniques and associated apparatus lends itself to many alternative embodiments all of which are deemed to be encompassed within the spirit and scope of the specification and the claims as appended.

We claim:

1. Apparatus for providing grey scale capability for an electrophoretic information display (EPID), comprising:
   timing generator means coupled to said display and operative to provide a voltage waveform for energizing said display and means for selecting the duration of said waveform as applied to said display according to a desired grey scale level.

2. The apparatus according to claim 1, wherein said electrophoretic display is an X-Y addressable display with each X-Y coordinate indicative of a given column and row intersection and whereby said means for selecting said duration are coupled to electrodes associated with either a column or row of said X-Y addressable display.

3. The apparatus according to claim 1, wherein said timing generator means includes means for generating a fixed duration voltage waveform and said means for selecting said duration includes means for applying said fixed duration waveform a given number of times to said display according to said desired grey scale level.

4. The apparatus according to claim 2, wherein said timing generator means includes a clock source and divider means for providing a plurality of output signals each having a given separate duration associated therewith and indicative of a given grey scale level for said display wherein a first one of said signals is indicative of white and a last one indicative of black with said signals in between indicative of a given number of grey scale levels between white and black.

5. The apparatus according to claim 4, further including logic means coupled to said timing generator means and operative to select any one of said output signals according to a select value determined by said logic means.

6. The apparatus according to claim 5, further including keyboard means coupled to said logic means and operative to generate alpha-numeric characters for presenting X-Y data to said display.

7. The apparatus according to claim 1, further including data receiving means for receiving analog signals, analog-to-digital converter means responsive to said received analog signals for providing digital output signals therefrom for application to said display said digital output signals containing information indicative of a given grey scale level to be impressed upon said display according to information contained in said analog signals.

8. The apparatus according to claim 7, wherein said analog-to-digital converter means includes a pixel generator generating X-Y data on a line-to-line basis for applying the same to said display in accordance with an associated grey scale level.

9. The apparatus according to claim 8, further including grey scale responsive means coupled to said display and operative to provide grey scale reference levels according to given display intensities for using said reference levels to control said timing generator means.

10. A method of providing grey scale capability for an electrophoretic information (EPID) display, of the type employing X-Y pixel selection comprising the steps of:
   selecting one of a plurality of different duration waveforms each at a given voltage level and each indicative of one of a plurality of grey scale values,
   applying said one selected waveform to given X-Y pixel locations of said display to provide said one grey scale level at any desired one of said X-Y pixel locations.

11. The method according to claim 10, wherein the step of selecting one of a plurality of different duration waveforms includes the step of
   dividing a given output duration clock waveform to provide a plurality of divided clock waveforms each having a different duration indicative of N levels of grey between a white and a black reference level, and selecting any one of said waveforms for application to an X or Y location associated with said display.

12. The method according to claim 10, further including the step of,
   generating a grey scale pattern on said display indicative of a plurality of levels between a white level and a black level,
   forming a plurality of reference signals each indicative of one of said levels and
   selecting said duration according to said reference signal.

13. The method according to claim 12, further including,
   transmitting beams of light through said display at given areas of said display associated with said grey scale pattern and
   monitoring the amount of light transmitted at each area to form said reference signals.

14. Apparatus for operating an electrophoretic information display (EPID) with grey scale capability, said EPID of the type having a plurality of pixel areas each accessible by an X-Y addressing format and each indicative of a given display content at that associated display area comprising,
   selectable timing means operative to provide at an output a plurality of selectable waveforms of a duration determined according to a different grey scale value,
   adressing means operative to select any one of said given pixel areas and responsive to a selected duration waveform for applying the same to said selected pixel areas whereby each waveform selected can cause said area to manifest a different one of said grey scale values including a black and a white value.

15. The apparatus according to claim 14, wherein said selectable timing means includes a clock source for generating a given duration waveform and means for applying said waveform a given number of times to said pixel as selected whereby said waveform as applied said given number of times is indicative of a given grey scale value.

16. The apparatus according to claim 14, further including a character generator means coupled to said selectable timing means and operative to provide digital signals indicative of alpha-numeric characters at an output, with said digital signals containing information indicative of associated grey scale levels.

17. The apparatus according to claim 14, wherein said addressing means includes an X decoder means for driving X lines associated with said display and a Y decoder means for driving Y lines associated with said display with intersections between X and Y lines indicative of said pixel areas.

18. The apparatus according to claim 14, further including a television camera for providing an output video signal indicative of a televised scene,
   analog-to-digital converter means for providing a pixel array according to said video signal and means for applying said pixel array to said X-Y decoding means to cause said display to provide a replica of said televised scene with said given grey scale levels determined according to the content of said televised scene.

19. The apparatus according to claim 14, wherein said display is of the type employing X lines deposited on a glass substrate and fabricated from indium-tin-oxide (ITO) at a thickness such that said line pattern is transparent and having insulated therefrom a Y line pattern also fabricated from ITO with the intersection at each X and Y line associated with a particle well and indicative of a pixel area for said display.

20. The apparatus according to claim 14, further including microprocessor means coupled to said timing means and addressing means and operative as programmed to generate said selected waveform indicative of a grey scale value and for generating said addresses of any one of said pixel areas.

* * * * *